(12) United States Patent
Yue et al.

(10) Patent No.: US 8,750,358 B2
(45) Date of Patent: Jun. 10, 2014

(54) METHOD FOR IMPROVING MULTIUSER MIMO DOWNLINK TRANSMISSIONS

(75) Inventors: Guosen Yue, Plainsboro, NJ (US); Narayan Prasad, Wyncote, PA (US); Meilong Jiang, Plainsboro, NJ (US); Mohammad A. Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 74 days.

(21) Appl. No.: 13/441,231

(22) Filed: Apr. 6, 2012

(65) Prior Publication Data

US 2012/0257664 A1    Oct. 11, 2012

Related U.S. Application Data

(60) Provisional application No. 61/472,521, filed on Apr. 6, 2011, provisional application No. 61/472,715, filed on Apr. 7, 2011.

(51) Int. Cl.
*H04B 17/00*    (2006.01)

(52) U.S. Cl.
USPC ........... 375/227; 375/220; 375/221; 375/267; 375/295; 375/299; 375/316; 375/340; 375/347; 455/63.1; 455/67.13; 455/69; 455/101; 455/132; 455/296; 455/500; 455/522; 455/562.1; 370/334

(58) Field of Classification Search
USPC ......... 375/220, 221, 227, 267, 295, 299, 316, 375/340, 347; 455/63.1, 67.13, 69, 101, 455/132, 296, 500, 522, 562.1; 370/334
See application file for complete search history.

(56) References Cited

U.S. PATENT DOCUMENTS

2009/0268621 A1*  10/2009  Hoshino et al. ............... 370/252
2011/0142147 A1*   6/2011  Chen et al. .................... 375/260

* cited by examiner

*Primary Examiner* — Leon Flores
(74) *Attorney, Agent, or Firm* — Joseph Kolodka; Akitaka Kimura

(57) ABSTRACT

A method for improving multiple-input multiple-output MIMO downlink transmissions includes obtaining a channel state information CSI report including preferred matrix index PMI for precoding, channel quality index CQI and rank index RI at a base station from user terminals through a channel feedback; applying selectively a signal-to-interference-plus-noise-ratio SINR offset to a SINR of said CSI report; applying selectively a rate matching responsive to SINR offset or the CSI report; and controlling or adjusting the SINR offset.

13 Claims, 9 Drawing Sheets

| Parameter | Assumption |
|---|---|
| Deployment scenario | IMT Urban Micro (UMi) |
| Duplex method and bandwidth | FDD: 10MHz for downlink |
| Cell layout | Hex grid 19 sites, 3 cells/site |
| Number of users per sector | 10 |
| Network synchronization | Synchronized |
| Antenna configuration (eNB) | 4 TX co-polarized antennas with $0.5\text{-}\lambda$ spacing |
| Antenna configuration (user) | 2 RX co-polarized antennas with $0.5\text{-}\lambda$ spacing |
| Downlink transmission scheme | MU-MIMO: Max 2 users/RB; Each user can have rank 1 or 2 |
| Codebook | Rel. 8 codebook [20] |
| Downlink scheduler | PF in time and frequency |
| Scheduling granularity: | 5 RBs |
| Feedback assumptions | 5ms periodicity and 4ms delay; Sub-band CQI and PMI feedback without errors. |
| Sub-band granularity: | 1 or 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 [21] |

Table 1: Simulation Parameters

FIG. 14

| MU-MIMO/SU-MIMO | Average Cell SE | 5% Cell-edge SE |
|---|---|---|
| SU-MIMO $r_{max} = 2$ | 2.1488 | 0.0679 |
| without SINR offset $r_{max} = 2$ | 1.49 | 0.0681 |
| 4dB SINR offset $r_{max} = 2$ | 1.922 | 0.0698 |
| user pooling (instant SINR) $r_{max} = 2$ | 2.1134 | 0.0800 (17.8%) |
| user pooling (long-term SNR) $r_{max} = 2$ | 2.2035 (2.6%) | 0.0701 (3.2%) |
| user pooling (instant SINR) $r_{max} = 1$ | 2.3027 (7.2%) | 0.0816 (20.2%) |
| user pooling (long-term SNR) $r_{max} = 1$ | 2.3964 (11.5%) | 0.0687 (1.2%) |
| w/ fine tuned SINR offset and pooling threshold | 2.4488 (13.9%) | 0.0797 (17.4%) |
| MRC SINR approx., no pooling, $r_{max} = 1$ | 2.4954 (16.1%) | 0.0832 (22.5%) |
| MRC SINR approx., pooling (instant SINR), $r_{max} = 1$ | 2.5141 (17.0%) | 0.0828 (21.9%) |

Table 2: Spectral efficiency performance of MU-MIMO with SU report using PF scheduling (near-orthogonal transmit precoding with ZF and subband size 5RB). The simple SINR scaling is employed. The percentage in the parentheses is the gain over the SU-MIMO performance given in the first row.

FIG. 15

| Type of reports and user pooling | Average Cell SE | 5% Cell-edge SE |
|---|---|---|
| MU report by all users | 2.3321 (8.5%) | 0.0734 |
| MU report by high geometry users 1 | 2.5572 (19.0%) | 0.0842 |
| MU report by high geometry users 2 | 2.6517 (23.4%) | 0.0966 |
| MU +SU Report by high geometry users | 2.694 (25.4%) | 0.0963 |
| MU +SU-CQI report by high geometry users | 2.693 (25.3%) | 0.0951 |
| SU report + MU-CQI by high geometry users | 2.6814 (24.8%) | 0.0951 |

Table 3: Spectral efficiency performance of MU-MIMO with various types of reports using PF scheduling (near-orthogonal transmit precoding with ZF and subband size 5RB). The percentage in the parentheses is the gain over the SU-MIMO performance given in Table 2.

FIG. 16

| Type of reports and user pooling | Average Cell SE | 5% Cell-edge SE |
|---|---|---|
| SU-MIMO | 2.046 | 0.0688 |
| MU-MIMO with SU report | 2.451 | 0.0844 |
| MU report by high geometry users | 2.5232 (3.0%) | 0.0879 (4.2%) |
| MU report by high geometry users $\alpha = 0.5$ | 2.5972 (6.0%) | 0.0885 (4.9%) |
| MU + SU-CQI report by high geometry users | 2.5765 (5.1%) | 0.0925 (9.6%) |
| MU + SU-CQI report by high geometry users $\alpha = 0.5$ | 2.6098 (6.5%) | 0.0888 (5.2%) |
| MU-CQI + SU report by high geometry users | 2.5642 (4.6%) | 0.0923 (9.4%) |
| MU-CQI + SU report by high geometry users $\alpha = 0.5$ | 2.5984 (6.0%) | 0.0905 (7.2%) |

Table 4: Spectral efficiency performance of MU-MIMO for various types of MU reports assuming uniform or non-uniform power allocation using PF scheduling (near-orthogonal transmit precoding with ZF and subband size 5RB, 4-bit CQI quantization). The percentage in the parentheses is the gain over the MU-MIMO performance with only the SU report given in the 2nd row.

FIG. 17

METHOD FOR IMPROVING MULTIUSER MIMO DOWNLINK TRANSMISSIONS

RELATED APPLICATION INFORMATION

This application claims priority to provisional application No. 61/472,521 filed Apr. 6, 2012 and provisional application No. 61/472,715 filed on Apr. 7, 2011, the contents thereof are incorporated herein by reference.

BACKGROUND

The present invention relates to wireless communication, and, more particularly, to a method for improving multiuser MIMO downlink transmission.

In the multi-input multi-output (MIMO) broadcast channel, also referred to as the downlink (DL) multiuser MIMO (MU-MIMO) channel, different data streams can be transmitted via transmit antenna arrays to multiple receivers through the same channel resources. The sum throughput can be significantly increased due to the multiuser diversity. It has been shown that the capacity of multiuser broadcast channel can be achieved with dirty paper coding (DPC). However, although DPC can be implemented based on vector quantizers and powerful channel codes (e.g., low-density parity-check codes or turbo codes), the extremely high complexity makes it infeasible to be implemented in practical cellular systems. Therefore, the suboptimal linear transmit precoding techniques are of great interests for DL MU-MIMO due to their much lower complexity compared with DPC. It is shown that when perfect channel state information (CSI) is available at the base station, the linear transmit precoding performs very close to DPC for MIMO broadcast channel. Hence, the MU-MIMO with low-complexity linear precoding has been included in the new cellular standards, e.g., the emerging 3GPP Long Term Evolution Advanced (LTE-A) and IEEE 802.16m.

However, in practical FDD cellular systems, only the quantized channel information can be reported from each active user to the serving base station. Such imperfect channel information causes severe performance degradation when MU-MIMO is dynamically scheduled as a transmission mode at the base station. For instance, in the 3GPP LTE-A standard, each active user reports a preferred matrix index (PMI) to the base station, which is an index that identifies either a particular vector in a codebook of unit norm vectors or a particular matrix in a codebook of semi-unitary matrices. The codebooks are known in advance to the base station as well as all users. Each user also reports one or more channel quality indices (CQIs) (per sub-band) which are its quantized estimates of the signal-to-interference-plus-noise ratios (SINRs). Since these CQIs can be directly mapped by the base station to certain SINRs via look-up-tables, we will refer to the latter SINRs as the SINRs contained in the user's CSI report or as SINRs of the CSI report. The reported PMIs and CQIs are then employed by the base station to determine a suitable set of scheduled users, their transmit precoders and assigned rates. In 3GPP LTE standard, the reported PMIs and CQIs are based on the assumption of the single user (SU) MIMO transmissions. While such quantized SU channel reports are sufficient for the link adaptation in SU-MIMO transmission, for MU-MIMO transmissions, such SU report results in a large mismatch between the channel SINR feedback and the actual SINR that the user sees after being scheduled. To alleviate this problem, the quantized channel feedback assuming MU-MIMO is proposed in to mitigate the SINR mismatch and enhance the performance of MU-MIMO. Other similar schemes aiming to improve the CQI accuracy for MU-MIMO have been actively investigated in the 3GPP LTE-A standards.

On the other hand, in a cellular system, users are usually asymmetric due to their different locations in a cell, i.e., different distances from the base station. Some user's channel can be much stronger than that of another user's, thus allowing it to enjoy a higher average throughput. To exploit multiuser diversity gains while achieving fair resource allocation among all serviced users, the proportional fair (PF) scheduling is a preferred approach which uses the sum of the normalized (or weighted) instantaneous user rates as the scheduling metric. However, for MU-MIMO such weighted sum rate metric brings some problems since the PF scheduling itself is sensitive to the accuracy of the available CSI and hence exacerbates the SINR mismatch problem, particularly when a user with a low average SNR is scheduled in a MU-MIMO transmission mode.

Among prior art techniques, there has been disclosed a method whereby an outer loop link adaptation (OLLA) is employed based on the transmission acknowledgement (ACK/NACK based) to improve the rate matching accuracy.

Applicants consider a downlink (DL) multiuser (MU) multi-input-multi-output (MIMO) channel with linear procoding where the base station schedules several user terminals on the same frequency sub-band the imperfect channel state information at the base station, e.g., the quantized channel feedback report. Among two types of channel state information (CSI) reports from user terminals, i.e., the CSI report that assumes the single-user (SU) MIMO transmissions and the enhanced CSI feedback that assumes the MU-MIMO transmissions. A large SINR mismatch is observed between the SINR feedback and the actual SNR that the user sees after being scheduled if MU-MIMO is scheduled with only the SU CSI report available or the SU-MIMO is scheduled with only the MU CSI report available at the base station. The SINR mismatch affects the rate matching accuracy which degrades overall system throughput. On the other hand, the MU-MIMO gain over SU-MIMO is only significant in the high SNR region. However, with the proportional fair (PF) scheduling which is commonly used in the commercial cellular system, the user with low SINR can be scheduled for MU-MIMO transmissions which not only reduce the MU-MIMO performance gain but also could hurt the overall system performance when SINR mismatch is involved.

Accordingly, there is a need for improved multiuser MIMO downlink transmission.

SUMMARY

A method for improving multiple-input multiple-output MIMO downlink transmissions includes obtaining a channel state information CSI report including preferred matrix index PMI for precoding, channel quality index CQI and rank index RI at a base station from user terminals through a channel feedback; applying selectively a signal-to-interference-plus-noise-ratio SINR offset to an SINR of said CSI report; applying selectively a rate matching responsive to SINR offset or the CSI report; and controlling or adjusting the SINR offset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 14 depicts Table 1: Simulation Properties.

FIG. 15 depicts Table 2: Spectral efficiency performance of MU-MIMO with SU report using PF scheduling (near-orthogonal transmit precoding with ZF and subband size 5 RB); simple SINR scaling is employed; and the percentage in the parentheses is the gain over the SU-MIMO performance given in the first row.

FIG. 16 depicts Table 3: Spectral efficiency performance of MU-MIMO with various types of reports using PF scheduling (near-orthogonal transmit precoding with ZF and subband size 5 RB); the percentage in the parentheses is the gain over the SU-MIMO performance given in Table 2.

FIG. 17 depicts Table 4: Spectral efficiency performance of MU-MIMO for various types of MU reports assuming uniform or non-uniform power allocation using PF scheduling (near-orthogonal transmit precoding with ZF and subband size 5 RB, 4-bit CQI quantization); the percentage in the parentheses is the gain over the MU-MIMO performance with only the SU report given in the 2nd row.

DETAILED DESCRIPTION OF PREFERRED EMBODIMENTS

The present invention is directed to a method to improve MU-MIMO system performance with an SINR offset and user pooling techniques for both the feedback mode selection and user pairing in the scheduler that enables dynamic switching between SU and MU MIMO transmissions.

I: SINR Offset for SU/MU-MIMO

Figure 1:
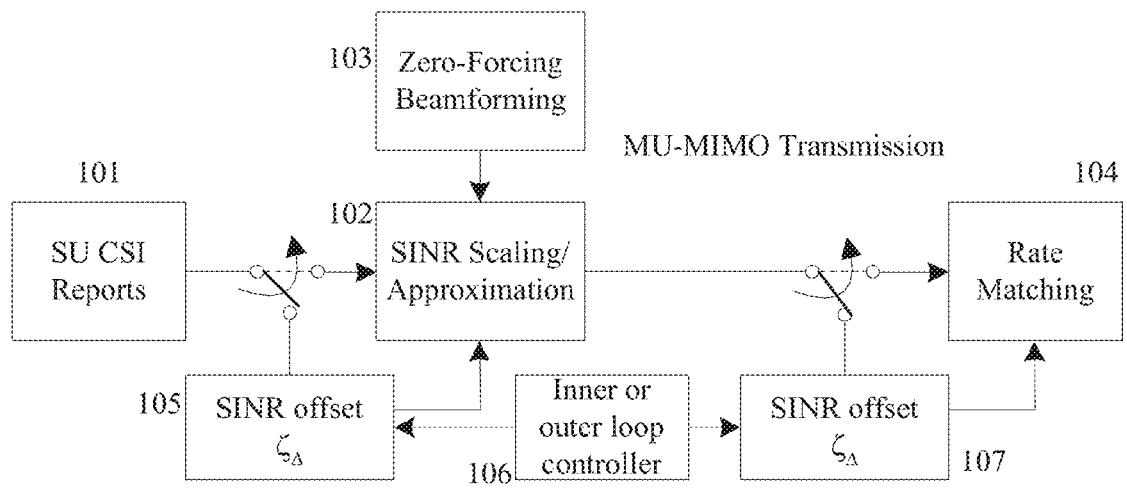
FIG. 1 is a schematic diagram of an SINR offset for MU-MIMO with SU CSI report, in accordance with the invention.

Referring now to FIG. 1, there is shown a diagram of the SINR offset for MU-MIMO transmission when only SU CSI reports are available, in accordance with the invention. It is assumed that the user pairing is done. But note that the above processes within FIG. 1 can also be implemented when the scheduler performs the user pairing/selection for MU-MIMO.

Initially SU CSI reports including preferred matrix index (PMI) for precoding, channel quality index (CQI) and rank index (RI) are obtained at a base station from the user terminals through the feedback channel 101. The SINR scaling/approximation to compute the SINR when the exact precoders for co-scheduled streams are decided or evaluated during the scheduling including MU-MIMO user pairing and resource allocation 102. If the columns of the overall precoding matrix are not orthogonal, the zero-forcing beamforming is applied 103. Rate matching and MCS assignment occur at 104. An SINR offset $\zeta_A$ is applied to the SU SINR(CQI) either before or after the SINR scaling approximation, or both before or after the SINR scaling possibly with different offset values 105. A controller controls/adjusts the SINR offset 106. It can be the unit of the scheduler or combined with another control unit, e.g., the controller for the outer loop link adaption (OLLA).

Figure 2:
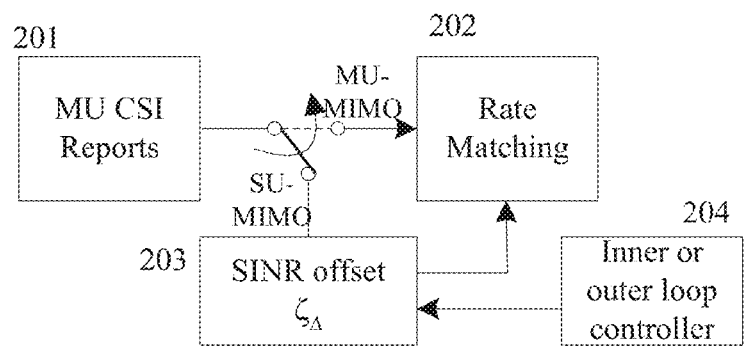
FIG. 2 is a schematic diagram of an SINR plot for SU-MIMO with MU CSI report, in accordance with the invention.

Referring now to FIG. 2, there is shown a diagram of the SINR offset for SU-MIMO transmission when only MU CSI reports are available, in accordance with the invention. Initially, the MU CSI reports including preferred matrix index (PMI) for precoding, channel quality index (CQI) and rank index (RI) are obtained at base station from the user terminals through the feedback channel 201. If MU-MIMO is scheduled, the rate matching is based on the MU reports directly 202. The ZF beamforming and SINR scaling in FIG. 1 can also be implemented here before rate matching 202. If SU-MIMO is scheduled, an SINR offset $\zeta_A$ is applied to the MU SINR(CQI) before the rate matching 203. A controller controls/adjusts the value of the SINR offset 204. It can be the unit of the scheduler or combined with another control unit, e.g., the controller for the outer loop link adaption (OLLA).

II: SINR Scaling/Approximation

Figure 3:
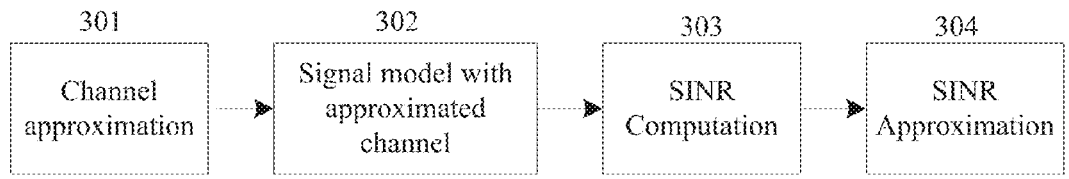
FIG. 3 is a diagram of an SINR approximation, in accordance with the invention.

Referring to FIG. 3, there is shown a diagram for SINR approximation, in accordance with the invention.

For channel approximation 301, based on the quantized channel feedback, we introduce some of the uncertainty. At the base station, the channel seen by user-j can be approximated as $H_j^\dagger = (\hat{G}_j + Q_j R_j) D_j^{1/2}$ where $H_j$ is the downlink channel matrix seen by user-j, where † denotes matrix Hermitian, $Q_j$ is an $M \times (M-\hat{r}_j)$ semi-unitary matrix whose columns are a basis for the orthogonal complement to the range of $\hat{G}_j$ (the reported precoder from user j) where M is the number of transmit antennas at the base station and $\hat{r}_j$ is the feedback rank (RI) from user j, $R_j$ is an $M-\hat{r}_j \times \hat{r}_j$ matrix which satisfies the Frobenius-norm constraint $\|R_j\|_F^2 \le \epsilon^2$ where $\epsilon$ can be determined based on the size of the quantization codebook and the channel statistics, $\hat{D}_j = \xi_j \text{diag}\{\gamma_{1,j}, \ldots, \gamma_{\hat{r}_j,j}\}$ and $\gamma_{i,j}$ are the SINR feedback for the ith stream of user j. Here $$\xi_j = \frac{\hat{r}_j}{\rho}$$

for SU reports and $$\xi_j = \frac{S}{\rho}$$

for MU reports, respectively, where $\rho$ is the total average power of all co-scheduled streams assumed by the user j in its SINR computations and S is the total number of co-scheduled streams or total rank Then the signal received model is built with an approximated channel 302 in one of two ways: a) the same signal model expression as the original MU-MIMO with channel matrix replaced by the approximation channel or b) a simplified model in which the introduced channel uncertainty affects only the interfering streams. For example, the channel output seen by the user-1 can be modeled as $$y_1 = \hat{D}_1^{1/2} \hat{G}_1^\dagger u_1 s_1 + \hat{D}_1^{1/2} (\hat{G}_1^\dagger + R_1^\dagger Q_1^\dagger) u_2 s_2 + \eta_1,$$

where $u_j$, $j=1, 2$, is the transmit precoding vector for user j and $s_j$, $j=1, 2$, is the modulated data symbol vector for user j. $\eta_j$ is the noise vector seen at user j.

Based on the signal model, we compute the SINR for a certain receiver, e.g., MMSE receiver or maximum ratio combining (MRC) receiver 303.

Then for the SINR approximation 304: Given a constraint on the uncertainty in the channel model $\|R_j\|_F^2 \leq \epsilon_2$ we find the conservative SINR approximation and use it as the estimated SINR for rate matching and MCS assignment. We assume 2-user pairing and one stream per user.

a) For original MIMO signal model with approximated channel, the worst SINR for the MMSE receiver can be found from the following optimization:

$$\min_{R_1 \in \mathbb{C}^{M-\hat{r}_1 \times \hat{r}_1} : \|R_1\|_F^2 \leq \epsilon^2} u_1^\dagger H_1^\dagger (I + H_1 u_2 u_2^\dagger H_1^\dagger)^{-1} H_1 u_1,$$

which can be solved by semidefinite programming (SDP).

b) For the simplified model, the worst SINR for the MMSE receiver can be found from the following optimization:

$$\min_{R_1 \in \mathbb{C}^{M-\hat{r}_1 \times \hat{r}_1} : \|R_1\|_F^2 \leq \epsilon^2} u_1^\dagger \hat{G}_1 \hat{D}_1^{1/2} (I + H_1 u_2 u_2^\dagger H_1^\dagger)^{-1} \hat{D}_1^{1/2} \hat{G}_1^\dagger u_1,$$

which can be solved by bisection search.

c) For the simplified model, the worst SINR for the MRC receiver can be found by $$\min_{R_1 \in \mathbb{C}^{M-\hat{r}_1 \times \hat{r}_1} : \|R_1\|_F^2 \leq \epsilon^2} \frac{\|u_1^\dagger \hat{G}_1 \hat{D}_1^{1/2}\|^4}{\|u_1^\dagger \hat{G}_1 \hat{D}_1^{1/2}\|^2 + \|u_1^\dagger \hat{G}_1 \hat{D}_1^{1/2} H_1 u_2\|^2},$$

which can be simplified as $$\frac{\|u_1^\dagger \hat{G}_1 \hat{D}_1^{1/2}\|^4}{\|u_1^\dagger \hat{G}_1 \hat{D}_1^{1/2}\|^2 + \left(|u_1^\dagger \hat{G}_1 \hat{D}_1 \hat{G}_1^\dagger u_2| + \epsilon \|u_1^\dagger \hat{G}_1 \hat{D}_1\| \|Q_1^\dagger u_2\|\right)^2}$$

For this case, we can extend it to the general case with more than 2 users and multiple streams per user. Assume that the precoding matrix $U_k$ is employed for user k, $k=1, \ldots Q$, where Q is the total number of co-scheduled users. Denoting $u_{i,k}$ as the ith column of the precoding matrix $U_k$ and $\overline{U}_{i,k}$ as the matrix obtained from $U_k$ with the removal of the ith column, the minimized SINR is then given by $$\frac{\|u_{i,1}^\dagger \hat{G}_1 \hat{D}_1^{1/2}\|^4}{\|u_{i,1}^\dagger \hat{G}_1 \hat{D}_1^{1/2}\|^2 + \|u_{i,1}^\dagger \hat{G}_1 \hat{D}_1 \overline{U}_{i,1}\|^2 + \sum_{k=2}^{Q} \sum_{j=1}^{r_k} \left(|u_{i,1}^\dagger \hat{G}_1 \hat{D}_1 \hat{G}_1^\dagger u_{j,k}| + \epsilon \|u_{i,1}^\dagger \hat{G}_1 \hat{D}_1\| \|Q_1^\dagger u_{j,k}\|\right)^2}$$

or with ZF, $$\frac{\|u_{i,1}^\dagger \hat{G}_1 \hat{D}_1^{1/2}\|^4}{\|u_{i,1}^\dagger \hat{G}_1 \hat{D}_1^{1/2}\|^2 + \|u_{i,1}^\dagger \hat{G}_1 \hat{D}_1 \hat{G}_1^\dagger \overline{U}_{i,1}\|^2 + \epsilon^2 \|u_{i,1}^\dagger \hat{G}_1 \hat{D}_1\|^2 \lambda_{\max}(Q_1^\dagger | \breve{U}_1)}$$

where $\lambda_{\max}(Q_1^\dagger \breve{U}_1)$ denotes the maximal eigen value of $\breve{U}_1^\dagger Q_1 Q_1^\dagger \breve{U}_1$ and $\breve{U}_1 \triangleq [U_2, \ldots, U_Q]$, i.e., the composite MU precoding for all the co-scheduled users except user-1

A simpler version of SINR approximation: SINR scaling; in this case, we only model the channel covariance $S_j = H_j^\dagger H_j$ by $S_j \approx \hat{S}_j \triangleq \hat{G}_j \hat{D}_j \hat{G}_j^\dagger$ based on precoder and SINR feedbacks. So the approximated SINR is then $$sinr_{i,j} = \frac{\alpha_{i,j}}{1 - \alpha_{i,j}} \text{ and}$$

$$\alpha_{i,j} = \left[(I + A^\dagger S_j A)^{-1} A^\dagger S_j A\right]_{\sum_{m=1}^{j-1} r_m + i, \sum_{m=1}^{j-1} r_m + i}, \quad i = 1, \ldots, r_j.$$

The error bound $\epsilon$ can be adjusted based on the channel statistics to obtain better performance. The above approximate SINR of the ith layer of the jth user, can be viewed as a scaled version of SINR of the ith layer of the jth user, contained in the user j's SU CSI report. The scaling factor is a function of the CSI report from user j, as well as those from the other co-scheduled users.

III: User Pooling for MU-MIMO

Figure 4:
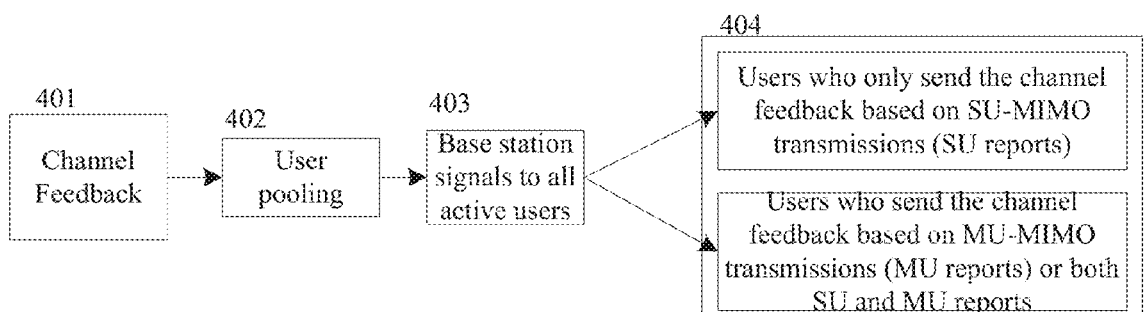
FIG. 4 is a diagram of user pooling on a feedback mode, in accordance with the invention.

Reference is now made to FIG. 4 which illustrates the process of user pooling for selecting/grouping users for different channel feedback. Based on some feedback channel knowledge 401, e.g., the long term average SNR, the base station pools user into two or more groups 402, one group of users to send back the quantized instant channel information assuming the SU-MIMO will be scheduled and some other users who should send back the quantized instant channel information assuming the MU-MIMO will be scheduled. Then the base station signals to all the active users based on the pooling results 403 and the users follow the base station instructions and send back the reports that base station intends to see. This process can be done in a semi-static manner.

Figure 5:
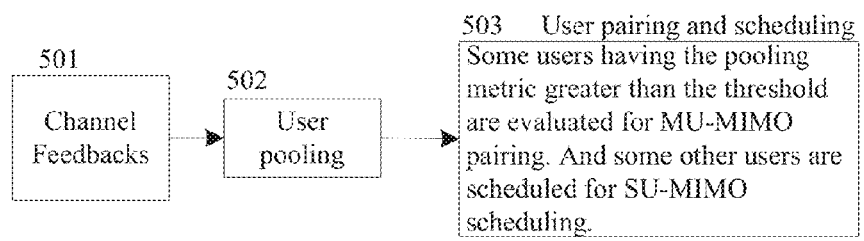
FIG. 5 is a diagram of user pairing and scheduling, in accordance with the invention.

Turning now to FIG. 5 and its diagram of user pairing and scheduling, in accordance with the invention, the user pooling can be implemented in the scheduler at the base station. Based on various channel feedbacks (either long-term or short term, or both, SU, MU reports, or both) 501, and based on the certain metrics, the user pooling 502 is performed to select user for MU-MIMO pairing. Then from the pooling results, some users are considered for user pairing for MU-MIMO transmission and others are only considered for SU-MIMO 503. Please note that user pooling can be dynamically changed for different subbands. Various pooling metrics are defined in the provisional application.

From the foregoing it can be appreciated that the inventive SINR offset, SINR scaling approximation, and user pooling method is efficient and improves the throughput of the MIMO systems in which the dynamic switching between MU-MIMO and SU-MIMO transmissions is supported. The inventive SINR offset can be employed in conjunction with the outer loop link adaptation.

2 FURTHER SYSTEM DETAILS

We consider a narrowband MU-MIMO signal model at a user terminal of interest in the aftermath of scheduling. Assume that the base station has M transmit antennas and each serviced user is equipped with N receive antennas. The received discrete signal vector at the jth user is given by $$y_j = H_j x + \eta_j, \quad (1)$$

where $H_j \in \mathbb{C}^{N \times M}$ is the channel matrix for the jth user and $\eta_j \sim CN(0, I)$ is the additive noise. The signal vector x transmitted by the base station can be expanded as $$x = \sum_{k \in U} V_k s_k \quad (2)$$

where U is the set of co-scheduled users, $V_k$ is the $M \times r_k$ precoding matrix with unit-norm columns and rank $r_k$, and $s_k$ is the $r_k \times 1$ symbol vector corresponding to user $k \in U$. Further, let $S = \sum_{k \in U} r_k$ be the total number of co-scheduled streams or total rank. The total power for all streams is $\rho$. If we assume equal power allocation, the power per stream is then given by $$\rho' = \frac{\rho}{S}.$$

In LTE-A, the dynamic switching between SU-MIMO and MU-MIMO transmission modes is supported. For SU-MIMO transmissions, only the data symbols to one user are transmitted through one of orthogonal resources in either time and/or frequency domain. Thus the transmitted signal vector x is simply the precoded QAM symbol vector to one user, i.e., $x = V_j s_j$. The received signal at the jth user terminal is then given by $$y_j = H_j V_j s_j + \eta_j. \quad (3)$$

3 CHANNEL FEEDBACKS FOR MU-MIMO

3.1 SU Channel Feedbacks

We first consider the channel report which assumes the SU-MIMO transmission to be scheduled, i.e., SU CSI report.

From the signal model in (3), given a precoding matrix G, the expected rate that can be achieved with the optimal maximum likelihood (ML) decoder is given by $$\log(|I + \rho' H G G^\dagger H^\dagger|), \quad (4)$$

where |•| denotes the matrix determinant and † denotes the matrix Hermitian. Here we drop the user index j for notation simplicity. Consequently, the precoder and rank are selected by maximizing the above expected rate, given by $$\{\hat{r}, \hat{G}_{\hat{r}}\} = \arg\max_{G \in C_r, r=1,\ldots,r_{max}} \{\log(|I + \rho' H G G^\dagger H^\dagger|)\}, \quad (5)$$

where $C_r$ denotes the set of precoding matrices of rank r and $r_{max}$ is the maximum rank. Usually $r_{max} = \min(N, M)$ unless the rank restriction is applied in the system.

Denote $G = [g_1, \ldots, g_r]$. When the user terminal employs a linear MMSE receiver, the precoder and the rank are then chosen by $$\{\hat{r}, \hat{G}_{\hat{r}}\} = \arg\max_{G \in C_r, r=1,\ldots,r_{max}} \left\{\sum_{i=1}^{r} \log\left(1 + SINR_{i,r}^{su\text{-}mmse}(G)\right)\right\}, \quad (6)$$

$$SINR_{i,r}^{su\text{-}mmse}(G) = \frac{\rho' g_i^\dagger H^\dagger (I + \rho' H G G^\dagger H^\dagger) H g_i}{1 - \rho' g_i^\dagger H^\dagger (I + \rho' H G G^\dagger H^\dagger) H g_i}. \quad (7)$$

Then the CSI reports including rank index (RI) $\hat{r}$, the PMI of the precoder $\hat{G}_{\hat{r}}$, and the quantized $\{SINR_{i,\hat{r}}^{su\text{-}mmse}(\hat{G}_{\hat{r}})\}_{i=1}^{\hat{r}}$ as CQIs for $\hat{r}$ layers are sent back to the base station through the feedback channel.

3.2 MU Channel Feedbacks

As will be shown below, the SINR computed by (7) assuming the SU-MIMO transmission has a large discrepancy with the actual SINR that the user experiences after MU-MIMO transmission is scheduled. The SINR mismatch affects the performance of rate matching such that the assigned modulation and coding scheme (MCS) will be either higher or lower than what the channel can support. Although a small SINR mismatch always exists in the cellular system due to quantized report or outdated feedback, a severe mismatch will causes a large throughput degradation. To overcome this, a new approach for PMI selection and SINR computation at the user terminal is developed which assumes the MU-MIMO transmission to be scheduled when selecting PMI and computing SINRs.

When a user determines its feedback, the user has access only to an estimate of $\rho H$. The observations in (1) that include the precoding matrices for other users can be received only after the scheduling (for the current frame) has been done by the base station. The scheduling in turn is based on the feedback reports that are received from all active users. Thus, this is a chicken-and-egg problem which results in a SINR mismatch. To alleviate this problem, we assume that an estimate of S is conveyed by the base station to each active user. In practice, the base station can convey an estimate of S to a user in a semi-static manner and such an estimate can be either user-specific or a fixed value for all users. The user then selects PMIs and compute SINRs based on its estimates of $\rho H$ and S using the rules described as follows.

We assume that the user reports one PMI along with one or more CQIs per sub-band (i.e., a contiguous time-frequency resource). The PMI identifies a precoder of rank r, where the CQIs are quantized estimates of SINRs. Here we also assume that only slow rank adaptation is allowed in MU-MIMO, i.e., the user selects precoding matrices of a common rank for several consecutive frames and the base station can possibly inform the user about a suitable rank r in a semi-static manner. Next, in order to determine a suitable semi-unitary matrix $\hat{G}$ from a set or codebook of rank-r semi-unitary matrices, $C_r$, along with r SINRs, the user of interest can use the rules which will be described next. The key idea of these rules for MU-MIMO based CSI report is to use an expected covariance matrix of all interfering signals which is computed by assuming that the co-scheduled interfering streams will be transmitted along vectors isotropically distributed in the orthogonal complement of the precoding vector or matrix being examined.

Without loss of generality, we assume that the user of interest is the first user, i.e., k=1. Suppose that the user considers reporting any precoder $G \in C^{M \times r}$ to the base station, i.e., upon doing so, the transmit precoder employed by the base station to serve it will be $V_1 = G$. The user assumes that the transmit precoders employed at the base station for the co-scheduled users will lie in the null-space of $V_1^\dagger$, i.e., $V_1^\dagger V_k = 0$, $\forall k \neq 1$. Since the estimate of total number of streams S will be delivered to the user, the user then assumes that there will be S–r such co-scheduled streams for other users in total. Denote $\Sigma$ as the covariance of the noise plus the interference from co-scheduled streams, i.e., $$\sum = \sum_{k \neq 1} \rho' H V_k V_k^\dagger H^\dagger + I. \quad (8)$$

When the user employs a linear MMSE receiver, a PMI is selected after determining r SINRs for each matrix in $C_r$. We now turn to lower bound approximation, where we assume $\tilde{\rho} H(I-GG^\dagger) H^\dagger$ being the expected covariance matrix of the interfering streams from other co-scheduled users, where $$\tilde{\rho} = \frac{\rho'(S-r)}{M-r}$$

is the power per layer of the interfering streams. The PMI selection rule which maximizes a lower bound on the expected rate obtained using the linear MMSE receiver is given by $$\hat{G} = \arg\max_{G \in C_r} \left\{ \sum_{i=1}^{r} \log\left(1 + SINR_{i,r}^{mu\text{-}mmse}(G)\right) \right\} \quad (9)$$

where $$SINR_{i,r}^{mu\text{-}mmse}(G) = \frac{h(H, G, \tilde{\rho})}{1 - h(H, G, \tilde{\rho})} \quad (10)$$

with
$h(H, G, \tilde{\rho}) = \rho' g_i^\dagger H^\dagger (I + \tilde{\rho} H(I - GG^\dagger) H^\dagger + \rho' HGG^\dagger H^\dagger)^{-1} H g_i$.

Nonuniform Power Allocation

In above rules for PMI selection and SINR computation, we assume equal power allocation, i.e., the total power is equally split on equal data stream in MU-MIMO transmissions. The power per stream is then $$\rho' = \frac{\rho}{S}.$$

One alternate way is to consider the nonuniform power allocation. When computing its SINR and selecting the PMI for MU-MIMO type of CSI report, the user assumes that a faction $\alpha$ of the total power $\rho$ will be equally allocated for its desired r streams by the base station and the remaining portion will be equally shared among the co-scheduled streams for other users. With nonuniform power allocation, the expressions in (9)-(10) remain unchanged for PMI selection and SINR computations. The only changes are made on the power per layer. Thus, for the nonuniform power allocation, the power per layer $\rho'$ for desired date streams of the user who computes feedback is given $$\rho' = \frac{\alpha \rho}{r}. \quad (11)$$

The power per layer of the interfering streams from co-scheduled users is then $$\tilde{\rho} = \frac{(1-\alpha)\rho}{M-r}. \quad (12)$$

4 BASE STATION PROCESSING FOR MU-MIMO 4.1 Proportional Fair MU-MIMO Scheduling

Based on the feedback from all active users, the base station allocates a user or a set of users to transmit in a certain resource block. Thus the scheduler at the base station needs to determine the user set U for MU-MIMO transmissions. Although the system throughput can be maximized by always serving the user with the best expected rate or a group of users with the best sum-rate, the weighted rate or sum-rate is usually considered in the practical system to ensure a certain fairness among all users in the serving cell. One popular approach is PF scheduling. Denote $R_k(t)$ and $T_k(t)$ as the instantaneous data rate and the average throughput of the kth user at the tth time slot, respectively. The PF scheduler selects users which maximizes the sum of the logarithms of the average throughputs, i.e., max $\Sigma_k$ log $T_k(t+1)$ for the transmission in the next time slot.

For the SU transmission case, only one user will be scheduled for transmission in one orthogonal resource block, i.e., U={k*}. Following the PF scheduling rule, the user k* is selected by $$k^* = \arg\max_k \frac{R_k(t)}{T_k(t)}. \quad (13)$$

Here we can see that the weight is the inverse of the user's average throughput. Then the average throughput is updated by $$T_k(t+1) = \begin{cases} \left(1 - \frac{1}{t_c}\right)T_k(t) + \frac{1}{t_c}R_k(t), & k = k^* \\ \left(1 - \frac{1}{t_c}\right)T_k(t), & k \neq k^* \end{cases} \quad (14)$$

where $t_c$ is the window size for calculating average throughput.

For MU transmissions, under proportional fairness, i.e., maximizing the sum of the logarithms of the average throughputs, the set of co-scheduled users is determined by [16]

$$U^* = \arg\max_U \prod_{k \in U} \left(1 + \frac{R_{k|U}(t)}{(t_c - 1)T_k(t)}\right), \quad (15)$$

where $R_{k|U}$ denotes the rate of user $k \in U$ and U is the candidate of the scheduled user set. If a user has a transmission rank r>1, the rate of this user $R_k(t)$ is the sum rate of all r data streams.

If the rate of user k does not depend on the rate of other user $j \in U$, $j \neq k$, on the co-scheduled streams, the set of users that maximizes $\Sigma_k \log T_k(t+1)$ among all possible choices of user selections can be simplified as $$\mathcal{U}^* = \arg\max_{\mathcal{U}} \sum_{k \in \mathcal{U}} \left(\frac{R_{k|\mathcal{U}}(t)}{T_k(t)}\right). \quad (16)$$

The average throughput of user k for MU transmissions is then updated by $$T_k(t+1) = \begin{cases} \left(1 - \frac{1}{t_c}\right)T_k(t) + \frac{1}{t_c}R_k(t), & k \in \mathcal{U}^* \\ \left(1 - \frac{1}{t_c}\right)T_k(t), & k \notin \mathcal{U}^* \end{cases} \quad (17)$$

In this paper, we use the rule in (16) as the PF scheduling criterion for sake of the simplicity.

4.2 SINR Approximation at the Base Station

For SU or MU MIMO transmissions, the instantaneous rate $R_k(t)$ can be obtained by $$R_k(t) = \sum_{j=1}^{r_k} (1 + sinr_{j,k}(t)), \quad (18)$$

where $sinr_{i,k}(t)$ can be obtained directly from the SINR feedback which is obtained from (7) in SU CSI report or from (10) in MU CSI report. However, using the SINR feedback to obtain the instantaneous rate for rate matching in MU-MIMO is not accurate because when computing SINRs, the user does not know in advance the exact precoders for the co-scheduled users. The user either neglects the interference from the co-scheduled streams by sending the SINR value based on SU-MIMO transmissions as in SU report or computes and reports SINRs based on an estimate of covariance from the interfering streams as in MU report. However, when scheduling the users, the base station knows the exact precoding matrices that will be used for all co-scheduled users. The base station is then able to recalculate the SINRs for co-scheduled streams based on the choice of user set and associated transmit precoders. Unfortunately, the base station does not have full knowledge of the channel state information from all users. We provide some methods for computing the estimate of SINRs with the exact precoders. We first introduce a simple SINR approximation, i.e., SINR scaling, using the approximate channel covariance based on CSI report. Then we provide the SINR approximations using the approximate MIMO channel for different receivers.

4.2.1 SINR Scaling

Suppose the base station considers co-scheduling Q users in one resource block, i.e., $|U|=Q$. Denote $\hat{G}_j$ as the reported precoder from user j with the rank $\hat{r}_j$, $j=1, \ldots, Q$. Denote $H_j$ as the channel seen by user j. Let $V_j$ be the transmit precoder that the base station intends to employ for the user j, where $V_j=[v_{1,j}, \ldots, v_{r_j,j}]$ with unit norm for each column, i.e., $\|v_{i,j}\|^2=1$. Define $A \triangleq \sqrt{\hat{\rho}}[V_1, \ldots, V_Q]$ as the overall precoding matrix for MU-MIMO transmissions, where $\hat{\rho}$ is the power per layer, i.e., $\hat{\rho}=\rho/\hat{S}$ with $\hat{S}=\Sigma_{j=1}^Q r_j$ being the number of columns in A, i.e., the total number of streams that base station intends to co-schedule. If the channel information $\{H_j\}_{j=1}^Q$ is perfectly known at the base station, assuming linear MMSE receiver, the exact SINR for the ith stream of the jth user can be computed by $$sinr_{i,j} = \frac{\alpha_{i,j}}{1 - \alpha_{i,j}}, \quad (19)$$

with $$\alpha_{i,j} = \hat{\rho} v_{i,j} H_j^\dagger (I + H_j A A^\dagger H_j^\dagger)^{-1} H_j v_{i,j}, \quad (20)$$

With matrix inverse lemma, we can rewrite $\alpha_{i,j}$ as $$\alpha_{i,j} = [(I + A^\dagger S_j A)^{-1} A^\dagger S_j A]_{\Sigma_{m=1}^{j-1} r_m + i, \Sigma_{m=1}^{j-1} r_m + i}, \; i=1, \ldots, r_j, \quad (21)$$

where $S_j = H_j^\dagger H_j$ and $[\bullet]_{m,n}$ denotes the entry of a matrix at the mth row and the nth column.

Since the perfect channel information $H_j$ is not available at the base station, to compute the true SINR in (19) based on the CSI feedback, we apply the following approximation $$S_j \approx \hat{S}_j \triangleq \hat{G}_j \hat{D}_j \hat{G}_j^\dagger, \quad (22)$$
$$j = 1, \ldots, Q,$$

where $\hat{D}_j = \xi_j \text{diag}\{\gamma_{1,j}, \ldots, \gamma_{\hat{r}_j,j}\}$ and $\gamma_{i,j}$ are the SINR feedback for the ith stream of user j. Here $$\xi_j = \frac{\hat{r}_j}{\rho}$$

for SU reports and $$\xi_j = \frac{S}{\rho}$$

for MU reports, respectively.

4.2.2 SINR Approximation with Approximate MIMO Channel

In this section we provide a method for computing an estimate of the SINR (per-RB) for each co-scheduled stream in each choice of user set with the channel approximation based on quantized CSI report available at the base station. While the method can be readily extended to allow for co-scheduling of an arbitrary number of streams using arbitrary transmit precoders, here we restrict our attention to all possible SU-MIMO configurations along with the practically possible MU-MIMO configuration, which is co-scheduling a user-pair with one stream per-user.

Note that the base-station has access to $\{\hat{G}_j, \hat{D}_j\}$ but does not know the actual channel seen by user-j. Due to the finite resolution of the quantization codebook, the component of the user-channel matrix that lies in the orthogonal complement of the range of the reported precoder matrix $\hat{G}_j$ is unknown to the base-station. Further, the user-reported quantized SINRs are computed under the assumption that the base-station will employ the precoder matrix $\hat{G}_j$ and together they encode the effective channel gains that will be seen by the user if $\hat{r}_j$ streams are transmitted along the columns of $\hat{G}_j$. With these observations in mind, we propose to approximate the channel seen by user-j as $$H_j^\dagger = (\hat{G}_j + Q_j R_j)\hat{D}_j^{1/2} \tag{23}$$

where $Q_j$ is an $M \times M - \hat{r}_j$ semi-unitary matrix whose columns are a basis for the orthogonal complement to the range of $\hat{G}_j$. $R_j$ is an $M - \hat{r}_j \times \hat{r}_j$ matrix which satisfies the Frobenius-norm constraint $\|R_j\|_F^2 \leq \epsilon^2$, where $\epsilon$ can be determined based on the size of the quantization codebook and the channel statistics. Now, in case of SU-MIMO scheduling (when Q=1) $V_j$ is a submatrix of $\hat{G}_j$ formed by a particular subset of its columns. This column subset is uniquely determined given $\hat{G}_j$ and the transmitted rank $r_j$. We first offer the following result Lemma 1 Under SU-MIMO scheduling, the true SINR seen by user-j for its $i^{th}$ stream, $\sinr_{i,j}$, can be lower bounded by $$\sinr_{i,j} \geq (\hat{r}_j/r_j)\gamma_{i,j}, \ 1 \leq i \leq r_j. \tag{24}$$

Next, in case of MU-MIMO scheduling let $v_{1,j}$, $1 \leq j \leq 2$ denote the two normalized transmit precoding vectors, respectively, with $A = [u_1, u_2] = \sqrt{\rho/2}[v_{1,1}, v_{1,2}]$ denoting the intended transmit precoder. We impose no restriction on how these transmit vectors are derived from the user reported precoders and quantized SINRs. Some typical methods are zero-forcing beamforming and maximum signal to leakage noise ratio (i.e., max SLNR) based beamforming [17, 18]. We offer the following result, where without loss of generality we consider user-1.

Lemma 2 Under MU-MIMO user pairing, the worst-case true SINR seen by user-1 for its stream, $\sinr_1^{wc}$ is given by $$\min_{R_1 \in \mathbb{C}^{M-\hat{r}_1 \times \hat{r}_1} : \|R_1\|_F^2 \leq \epsilon^2} u_1^\dagger H_1^\dagger (I + H_1 u_2 u_2^\dagger H_1^\dagger)^{-1} H_1 u_1 \tag{25}$$

Then, defining $C(f) = A^T \overline{Q}_1 \otimes (f\hat{D}_1^{1/2})$, $r = \text{vec}(R_1^\dagger)$, $d(f) = [f\hat{D}_1^{1/2}\hat{G}_1^\dagger u_1 - 1, f\hat{D}_1^{1/2}\hat{G}_1^\dagger u_2]^T$, the worst-case true SINR can be lower bounded as $$\frac{1}{1+\hat{a}},$$

where $\hat{a}$ is the solution of the following SDP:

$$\min_{\tau,\theta,f,\lambda} \tau + \theta \tag{26}$$

$$\text{s.t.} \begin{bmatrix} \tau - \lambda & d(f)^\dagger & 0 \\ d(f) & I & -\epsilon C(f) \\ 0 & -\epsilon C(f)^\dagger & \lambda I \end{bmatrix} \geq 0, \tag{27}$$

$$\begin{bmatrix} \theta & f \\ f^\dagger & I \end{bmatrix} \geq 0 \tag{28}$$

Another simplified model is also possible. Here we assume that the channel output seen by user-1 can be modeled as follows.

$$y_1 = \hat{D}_1^{1/2}\hat{G}_1^\dagger u_1 s_1 + \hat{D}_1^{1/2}(\hat{G}_1^\dagger + R_1^\dagger Q_1^\dagger)u_2 s_2 + \eta_1, \tag{29}$$

where $\eta_1 \sim CN(0, I)$. Note that in (29) we essentially assume that the uncertainty in the channel affects only the interfering stream.

For this model, let us first determine the true worst-case SINR seen by user-1 assuming that it employs the MMSE receiver. The worst-case SINR can now be written as $$\min_{R_1 \in \mathbb{C}^{M-\hat{r}_1 \times \hat{r}_1} : \|R_1\|_F^2 \leq \epsilon^2} u_1^\dagger \hat{G}_1 \hat{D}_1^{1/2}(I + H_1 u_2 u_2^\dagger H_1^\dagger)^{-1} \hat{D}_1^{1/2} \hat{G}_1^\dagger u_1 \tag{30}$$

Lemma 3 Under MU-MIMO user pairing and the model in (29), the worst-case true SINR seen by user-1 for its stream can be lower-bounded as follows. Defining $c(f) = u_2^T \overline{Q}_1 \otimes (\hat{D}_1^{1/2})$, $r = \text{vec}(R_1^\dagger)$, $d(f) = f\hat{D}_1^{1/2}\hat{G}_1^\dagger u_2$, the worst-case true SINR is lower bounded by $\hat{b}^2$, where $\hat{b}$ is the solution of the following optimization problem.

$$\max_{\tau,a,b,\theta,f,\lambda} \tau \tag{31}$$

$$\text{s.t.} \begin{bmatrix} b - \lambda & d(f)^\dagger & 0 \\ d(f) & b & -\epsilon c(f) \\ 0 & -\epsilon c(f)^\dagger & \lambda I \end{bmatrix} \geq 0,$$

$$\begin{bmatrix} \theta & f \\ f^\dagger & \theta I \end{bmatrix} \geq 0,$$

$$b^2 + \theta^2 \leq a^2,$$

$$f\hat{D}_1^{1/2}\hat{G}_1^\dagger u_1 \geq a\tau$$

(31) can be solved using a bisection search on $\tau$ wherein an SDP in the remaining variables is solved for each fixed choice of $\tau$.

Let us now consider the MRC receiver (i.e., user-1 uses the linear combiner $u_1^\dagger \hat{G}_1 \hat{D}_1^{1/2}$) and the model in (29). Now the worst-case SINR can be expressed as:

$$\min_{R_1 \in \mathbb{C}^{M-\hat{r}_1 \times \hat{r}_1} : \|R_1\|_F^2 \leq \epsilon^2} \frac{\|u_1^\dagger \hat{G}_1 \hat{D}_1^{1/2}\|^4}{\|u_1^\dagger \hat{G}_1 \hat{D}_1^{1/2}\|^2 + |u_1^\dagger \hat{G}_1 \hat{D}_1^{1/2} H_1 u_2|^2} \tag{32}$$

which can be simplified as $$\frac{\|u_1^\dagger \hat{G}_1 \hat{D}_1^{1/2}\|^4}{\|u_1^\dagger \hat{G}_1 \hat{D}_1^{1/2}\|^2 + \left(|u_1^\dagger \hat{G}_1 \hat{D}_1 \hat{G}_1^\dagger u_2| + \epsilon\|u_1^\dagger \hat{G}_1 \hat{D}_1\|\|Q_1^\dagger u_2\|\right)^2} \quad (33)$$

For the MRC receiver, we can extend the above SINR approximation to a general case of Q users (Q≥2) with the precoding matrix $U_k$ employed for the kth user. The signal model received at user-1 in (34) can be rewritten as $$y_1 = \hat{D}_1^{1/2} \hat{G}_1^\dagger U_1 s_1 + \sum_{k=2}^{K} \hat{D}_1^{1/2} \left(\hat{G}_1^\dagger + R_1^\dagger Q_1^\dagger\right) U_k s_k + \eta_1. \quad (34)$$

User-1 then applies the linear combiner for the ith stream $u_{i,1}^\dagger \hat{G}_1 \hat{D}_1^{1/2}$, where $u_{i,k}$ denotes the ith column of the precoding matrix $U_k$. The worst-case SINR can be expressed as:

$$\min_{R_1 \in \mathbb{C}^{M-\hat{r}_1 \times \hat{r}_1} : \|R_1\|_F^2 \leq \epsilon^2} \frac{\|u_{i,1}^\dagger \hat{G}_1 \hat{D}_1^{1/2}\|^4}{\|u_{i,1}^\dagger \hat{G}_1 \hat{D}_1^{1/2}\|^2 + \|u_{i,1}^\dagger \hat{G}_1 \hat{D}_1 \hat{G}_1^\dagger \overline{U}_{i,1}\|^2 + \sum_{k=2}^{Q} \|u_{i,1}^\dagger \hat{G}_1 \hat{D}_1^{1/2} H_1 U_k\|^2}, \quad (35)$$

where $\overline{U}_{i,k}$ denotes the matrix obtained from $U_k$ with the removal of the ith column. By separating each layer from interfering users and applying (33), we can obtain the lower bound of (35), given by $$\frac{\|u_{i,1}^\dagger \hat{G}_1 \hat{D}_1^{1/2}\|^4}{\|u_{i,1}^\dagger \hat{G}_1 \hat{D}_1^{1/2}\|^2 + \|u_{i,1}^\dagger \hat{G}_1 \hat{D}_1 \hat{G}_1^\dagger \overline{U}_{i,1}\|^2 + \sum_{k=2}^{Q} \sum_{j=1}^{\hat{r}_k} \left(|u_{i,1}^\dagger \hat{G}_1 \hat{D}_1 \hat{G}_1^\dagger u_{k,j}| + \epsilon\|u_{i,1}^\dagger \hat{G}_1 \hat{D}_1\|\|Q_1^\dagger u_{j,k}\|\right)^2} \quad (36)$$

With ZF precoding, we can simplify (35) as $$\frac{\|u_{i,1}^\dagger \hat{G}_1 \hat{D}_1^{1/2}\|^4}{\|u_{i,1}^\dagger \hat{G}_1 \hat{D}_1^{1/2}\|^2 + \|u_{i,1}^\dagger \hat{G}_1 \hat{D}_1 \hat{G}_1^\dagger \overline{U}_{i,1}\|^2 + \epsilon^2 \sum_{k=2}^{Q} \|u_{i,1}^\dagger \hat{G}_1 \hat{D}\|^2 \lambda_{max}(Q_1^\dagger U_k)}, \quad (37)$$

where $\lambda_{max}(Q_1^\dagger U_k)$ denotes the maximal eigen value of $U_k^\dagger Q_1 Q_1^\dagger U_k$. The proof of (37) is given as follows.

Proof: Denote $\Psi_k = \|u_{i,1}^\dagger \hat{G}_1 \hat{D}_1^{1/2} H_1 U_k\|^2$. From (23), we have $$\Psi_k = \|u_{i,1}^\dagger \hat{G}_1 \hat{D}_1 (\hat{G}_1^\dagger + R_1^\dagger Q_1^\dagger) U_k\|^2 = \|u_{i,1}^\dagger \hat{G}_1 \hat{D}_1 R_1^\dagger Q_1^\dagger U_k\|^2, \quad (38)$$

where the second equality follows from $\hat{G}_1^\dagger U_k = 0$ for $k \neq 1$ due to ZF precoding. We drop the subscripts and let $\Psi_k = \|b^\dagger R^\dagger Z\|^2$, where $$b^\dagger \triangleq u_{i,1}^\dagger \hat{G}_1 \hat{D}_1$$

and $$Z \triangleq Q_1^\dagger U_k,$$

Define $$\tilde{b}^\dagger \triangleq [\|b\|, 0, \cdots, 0].$$

We let $b^\dagger = \tilde{b}^\dagger \tilde{U}$ and obtain the SVD decomposition of Z, given by $$Z = \tilde{W} \Lambda \tilde{V}^\dagger, \quad (39)$$

where $\tilde{U}$, $\tilde{W}$, and $\tilde{V}$, are unitary matrices, and $\Lambda$ is the matrix in which the diagonal elements are the ordered singular values of Z and all other entries are zeros. We then have $$\Psi_k = \|\tilde{b}^\dagger \tilde{U} R^\dagger \tilde{W} \Lambda \tilde{V}^\dagger\|^2 = \quad (40)$$
$$\|\tilde{b}^\dagger R^\dagger \Lambda\|^2 = \|b\|^2 \|r_1^\dagger \Lambda\|^2 = \|b\|^2 \sum_i |R_{1i}|^2 \sigma_i^2.$$

We assume $\sigma_1^2 \geq \sigma_2^2 \geq \ldots$. Since $\|r_1\|^2 \leq \|R\|_F^2 \leq \epsilon^2$, we have $$\Psi_k \leq \|b\|^2 \sigma_1^2 \sum_i |R_{1i}|^2 \leq \epsilon^2 \|b\|^2 \sigma_1^2. \quad (41)$$

Therefore, we obtain the expression in (37).

To set $\epsilon^2$ with a reasonable value, we can first the statistics of $\|R\|_F^2$ based on a certain channel model, which is explained in Appendix A in detail. We can also set $\epsilon^2$ according to its statistics obtained directly from the simulations.

5 MU-MIMO PERFORMANCE ENHANCEMENTS FOR PRACTICAL CONSIDERATIONS

5.1 SINR Mismatch and SINR Offset

5.1.1 SINR Mismatch Performance of SU and MU CSI Reports

Figure 6:
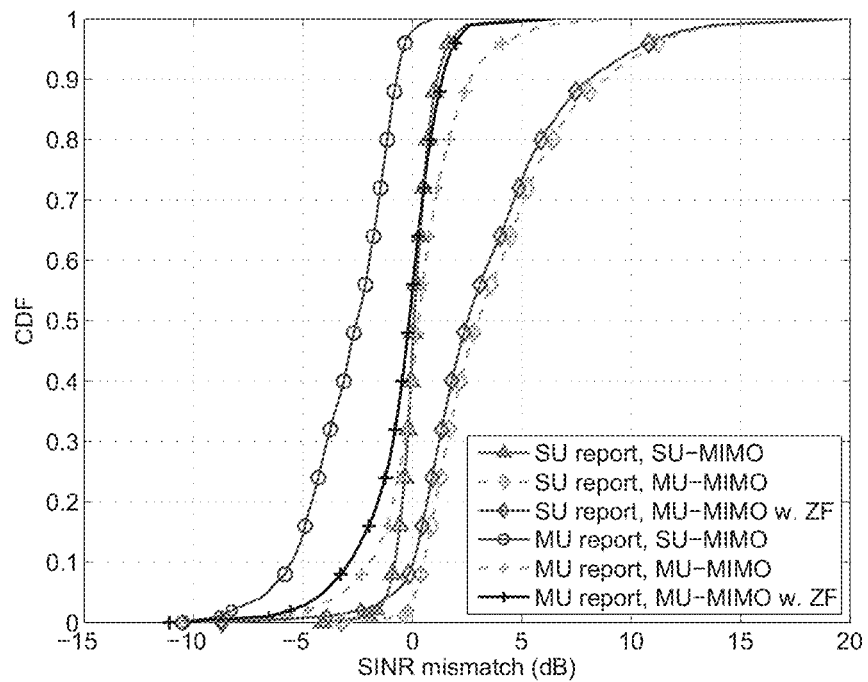
FIG. 6 shows the CDF curves of the SINR mismatch between the SINR feedback and the actual SINR after scheduling.

As aforementioned, there is a mismatch between the channel SINR feedback and the actual SINR that the user sees after being scheduled. The SINR feedback in the SU CSI report assuming SU-MIMO transmission results in a large SINR mismatch if the MU-MIMO transmission is scheduled. The MU report is presented in Section 3.2 to mitigate such SINR mismatch. We now evaluate the SINR mismatch performance for the SINR feedback in both SU and MU feedback reports. For each type of channel report, we consider the following three cases, namely, the SU-MIMO transmission, MU-MIMO transmission, and the MU-MIMO transmission with SINR scaling and ZF beamforming. The cumulative distribution function (CDF) curves of the SINR mismatch for these cases are illustrated in FIG. 6. We know that the perfect SINR feedback will result in a zero value of SINR mismatch. Consequently, the CDF curve of the SINR mismatch for the perfect channel feedback is a unit step function. Therefore, the SINR mismatch CDF curves for better SINR feedback at the user end or SINR approximation at the base station should be closer to the unit step function. The positive value of the SINR mismatch means that the SINR reported by the user is larger than the actual receive SINR when the corresponding stream is transmitted. Using such overestimated SINR feedback for rate matching or MCS assignment will cause the decoding error at the receiver and incur a retransmission. The negative value of SINR mismatch indicates that the SINR feedback underestimates the actual SINR. Although the transmitted data stream with the rate matching based on the underestimated SINR can be decoded at receiver, the assigned data rate is lower than what the channel can actually support, which causes performance degradation.

Based on above discussions, we can see from FIG. 6 that the SINR feedback in SU reports provides the best estimate for the actual SINR. However, the SU report results in a extremely large SINR mismatch when MU-MIMO transmission is scheduled. The most portion of the SINR mismatch for such case is in the positive region, meaning that neglecting the interference from co-scheduled users is too optimistic on the SINR feedback. With SINR scaling, the SINR mismatch is slightly improved. On the contrary, we can see that with the MU report, the SINR mismatch is significantly improved over the SU report. Although the performance of MU report for MU-MIMO is not as good as the SU report for SU-MIMO transmissions, its SINR mismatch CDF curve is very close to that of SU-MIMO with SU report, indicating that the MU feedback provides a good estimate of SINR for the MU-MIMO transmission even the user does not have the knowledge of precoding matrix for the co-scheduled streams in advance. With SINR scaling, the SINR computation for MU-MIMO transmission is further improved. The SINR mismatch CDF curve is almost overlapped with that of SU report for SU-MIMO. However, a large mismatch observed for the SU-MIMO transmission with only the MU CSI report. We can see that the SINR feedback in the MU report is mostly smaller than the actual SINR value that user sees after being scheduled, which will incur performance degradations due to the channel underestimation.

5.1.2 SINR Mismatch Remedy for SU and MU Reports

With signal-to-interference-plus-noise-ratio SINR mismatch results for different scenarios, we can come up with a simple remedy for the SINR mismatch by applying offset value $\zeta_A$ to the SINR feedback (in dB). The SINR offset can be user-specific or uniform among all users. For the SINR feedback in the SU report, when MU-MIMO transmission is scheduled, before the rate matching, we apply a negative offset on the SINR feedback on the SINR feedback directly or on the SINR computed after SINR approximation described in Section 4. If the SINR offset is applied before the SINR approximation, $\hat{D}_j$ in (22) becomes $\hat{D}_j = \zeta_A \xi_j \operatorname{diag}\{\gamma_{1,j}, \ldots, \gamma_{\hat{r}_j,j}\}$. On the other hand, when SU-MIMO transmission is scheduled based on the SINR feedback in the MU report, we simply apply a positive offset on the SINR feedback. Note that the SINR offset is applied only when the type of SINR feedback is different from the MIMO transmission mode eventually being scheduled by the base station. As discussed above, the SINR feedback from SU report provides a good match for SU-MIMO transmissions, so does the SINR feedback from MU report for MU-MIMO transmissions. We then do not need to apply any SINR offset for these two cases.

Figure 7:
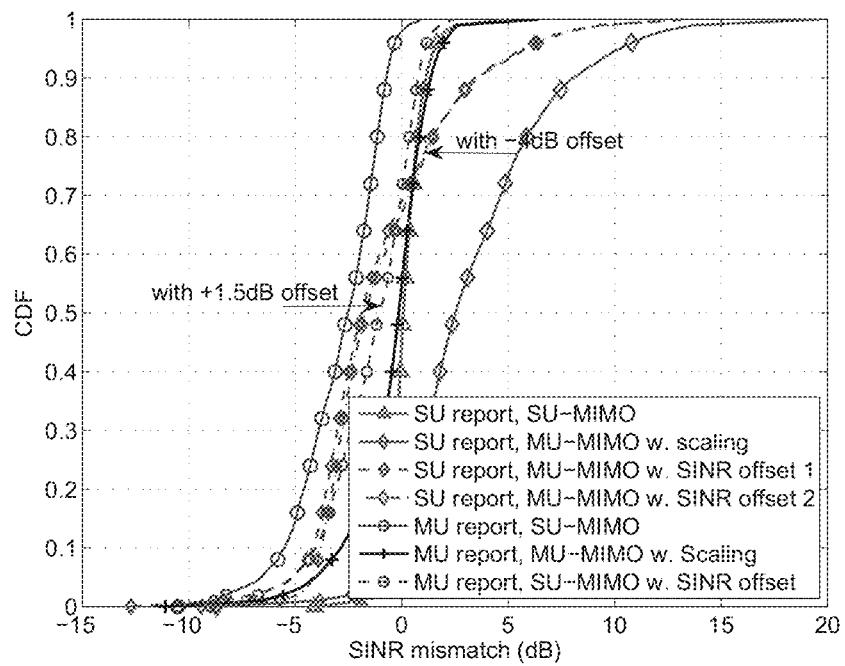
FIG. 7 shows the CDF curves of the SINR mismatch between the SINR feedback and the actual SINR after scheduling with SINR offset, Offset 1: after scaling; Offset 2: before SINR scaling.

The CDF curves of the SINR mismatch after applying a SINR offset are illustrated in FIG. 7. For MU-MIMO with SU reports, a uniform $\zeta_A=-4$ dB SINR offset is applied to the SINR values before or after the SINR scaling. For the SU-MIMO transmission with MU reports, a uniform $\zeta_A=+1.5$ dB is added to the feedback SINR. From this it can be seen that the simple uniform SINR offset can improve the SINR mismatch performance significantly. For MU-MIMO with SU reports, the SINR mismatch results for the offset applied before and after SINR scaling are a little bit different. The one applied before SINR scaling is slightly better as it is closer to the unit step function. However, compared with the performance of the MU report, the SINR mismatch CDF curve after applying a SINR offset for the SU report in MU-MIMO transmission is still quite off the step function with larger tails in both the positive and negative regions. If we compare the effects between the SINR overestimation (SINR mismatch in the positive region) and underestimation (SINR mismatch in the negative region), we find that the performance loss caused by SINR overestimation is more than that caused by the SINR underestimation. The rationale behind this is that the current commonly used scheduling algorithm is inefficient on the resource allocations for retransmissions as the SINR overestimation will mostly result in a retransmission which doubles the usage of channel resources for the same data sequence while the SINR underestimation only incurs a small factional rate loss.

Search for Optimal SINR Offset:

Although it is more reasonable to apply the SINR offset before the SINR scaling, i.e., directly on the SINR feedback, it is more flexible and less complex for the base station to apply the SINR offset after SINR approximation (before the rate matching or MCS assignment) so that base station can easily adjust the offset value and combine it with outer loop link adaptation (OLLA). For the SINR offset after ZF beamforming, we can numerically find a good value from the SINR mismatch evaluations. We have collect $N_s$ samples of SU reports with SINR scaling and ZF beamforming $\widetilde{\operatorname{sinr}}_n$ and the corresponding actual SINR that user experiences $\operatorname{sinr}_n$, in MU-MIMO transmissions. Assuming that Chase combining hybrid automatic repeat request (ARQ) is employed, given a SINR offset $\zeta_A$, the average spectral efficiency in a cell can be approximated by the average rate of $N_s$ samples, given by $$\tilde{R} = \frac{1}{N_s} \sum_{n=1}^{N_s} \frac{\log_2(1+\zeta_A \widetilde{\operatorname{sinr}}_n)}{L_n^{(CC)}} 1(L_n^{(CC)} \leq L_M), \tag{42}$$

where $1(\cdot)$ is the indicator function, $L_n^{(CC)} = \lceil \zeta_A \widetilde{\operatorname{sinr}}_n / \operatorname{sinr}_n \rceil$ is the number of retransmissions required for successfully decoding at the receiver, and $L_M$ denotes the maximum number of retransmissions allowed in the system. We evaluate the average rate from the samples for difference values of $\zeta_A$ and find the one with the best output.

If hybrid ARQ with incremental redundancy (IR) is employed, the average rate can be written as $$\tilde{R} = \frac{1}{N_s} \sum_{n=1}^{N_s} \frac{\log_2(1+\zeta_\Delta \widetilde{\sinr}_n)}{L_n^{(IR)}} 1(L_n^{(IR)} \leq L_M), \quad (43)$$

where $L_n^{(IR)} = \lceil \log_2(1+\zeta_\Delta \widetilde{\sinr}_n)/\log_2(1+\sinr_n) \rceil$.

5.2 User Pooling

5.2.1 User Pooling for Feedback Mode Selection

In LTE-A systems, dynamic switching between SU-MIMO and MU-MIMO transmissions is supported. As shown in Section 5.1, when feedback is computed assuming a different transmission mode, a severe SINR mismatch occurs, particularly for the case of MU-MIMO scheduling based on SU CSI reports. Although a simple uniform SINR offset can alleviate such mismatch, the large tails on both side of the CDF curves will still cause a certain performance loss. Since the MU reports provide better estimate of the SINR for MU-MIMO transmissions, the better solution would be that both types of CSI reports are available at the base station. However, the feedback channel resource is expensive and limited. To overcome this problem, we can perform a user pooling for feedback mode selection as follows.

As we know, the performance gain of MU-MIMO is mostly achieved in the high SNR region. Therefore, we pool the users into two groups. For the low geometry users who are mostly away from the base station, we do not need to schedule them for MU-MIMO transmissions so that only the SU report is needed. For high geometry users who are close to the base station, we request them send the MU CSI report or both SU and MU reports. Since the pathloss on the transmit power is inversely proportional to the square or cubic of the distance, the low geometry users usually have smaller values on the average SNR than the high geometry users. Hence, we impose a SNR threshold, $SNR_{th}$ on the long-term average SNR which is available at the base station. For the users with the long-term average SNR smaller than $SNR_{th}$, we request only the SU report from them. For the users with the long-term average SNR larger than $SNR_{th}$, we request the MU report or both SU and MU reports from this group of users. Note that if we only request the MU report for high geometry users, the amount of feedback resource will be the same as that for the SU-MIMO systems. The only signal overhead would be the signaling for the feedback mode selection which can be sent in a semi-static manner.

5.2.2 User Pooling for Scheduling

Similarly for selection of the feedback reports, we can also apply the user pooling at the base station when the pairs users for MU-MIMO in the scheduler. Again, we pool the active users into two groups. For one group of users, we only schedule them with SU-MIMO transmissions. For the other group of users, we schedule them with dynamic switching between SU-MIMO and MU-MIMO transmissions. We consider the following three metrics for user pooling.

Long-Term Average SNR:
If only one type of channel report at the base station, similarly as user pooling for feedback mode selection, we group users by imposing a threshold $SNR_{th}$ on the long-term average SNR. We put a user with long-term average SNR below the threshold $SNR_{th}$ into the pool of which the users will be scheduled only for SU-MIMO transmissions. Only for the user has a long-term average SNR above the threshold $SNR_{th}$, we put it into the pool of users enabled for MU pairing.

Instantaneous SINR:
Long-term average SNR only indicates the average channel quality of the user. With the small-scale fading, the channel quality varies in a short time scale. Therefore, instead of long-term average SNR, the instantaneous SINR can also be the metric for user pooling. The instantaneous SINR can be obtained by the channel feedback from either SU report or MU report. Since feedback RI $\hat{r}_k$ can be greater than one, we then consider the following rule to obtain the instantaneous SINR. We first obtain the sum rate $R_k$ from the CSI feedback for all $\hat{r}_k$ streams for the user. We then obtain the mapped SINR for user pooling from the sum-rate $R_k$ or rate per layer $R_k/\hat{r}_k$, respectively given by $$\sinr'_k = 2^{R_k}-1 \text{ or } \sinr'_k = 2^{R_k/\hat{r}_k}-1. \quad (44)$$

We then compare the $\sinr'_k$ with the threshold $SNR_{th}$ for user pooling.

Weighted Sum-Rate:
Since a weighted rate, i.e., the normalized instantaneous rate $R_k/T_k$, is used as the PF scheduling metric, it is then natural to consider it as the user pooling metric. Similarly as before, we can first map the value $R_k/T_k$ to a SINR value by $\sinr'_k = 2^{R_k/T_k}-1$ then compare it with the threshold for user pooling.

Please note that even with two types of feedback reports from a group of users or all active users, we can still employ such user pooling for the scheduling to improve the system throughput performance. The performance gain may be much smaller, though.

6 SIMULATION RESULTS

We now evaluate the MU-MIMO performance with the different types of channel reports and the enhancement methods described in Section 4 and Section 5 via system level simulations of a MIMO-OFDM system. The simulation parameters are summarized in Table 1, FIG. 13.

6.1 Performance of MU-MIMO with SU Report

We first consider the MU-MIMO with only the SU CSI report. The cell average spectral efficiencies and the 5% cell edge spectral efficiencies of MU-MIMO performance for various settings have been determined. The SU-MIMO performance is also included for comparisons. The SINR scaling and ZF beamforming described in Section 4 are employed for all settings. For some cases, the SINR offset and user pooling are applied to improve the system throughput. Since there is only one type of CSI report available at the base station, the user pooling is only applied in the scheduler. We set $SNR_{th}=7$ dB as the pooling threshold. It can be seen that without any processing on the SU report, the average cell spectral efficiency performance of MU-MIMO is much worse than that of SU-MIMO. With a simple −4 dB SINR offset, the spectral efficiency performance is improved significantly but still below the SU-MIMO mark. We can see that with user pooling based on the long-term average SNR and instant SINR, the performance of MU-MIMO is further improved and the gain of MU-MIMO over the SU-MIMO transmission is then realized. We then set a rank restriction, i.e., $r_{max}=1$, in the simulation so that users only report the PMI of the best rank-1 precoding vector and the associated SINR. As can be seen from Table 2, FIG. 13, the performance of the user pooling based on instant SINR and long-term average SNR improves. The best spectral efficiency performance with rank-1 restriction is from the user pooling based on long-term average SNR, which is about 11.5% improvement over that of SU-MIMO.

Figure 8:
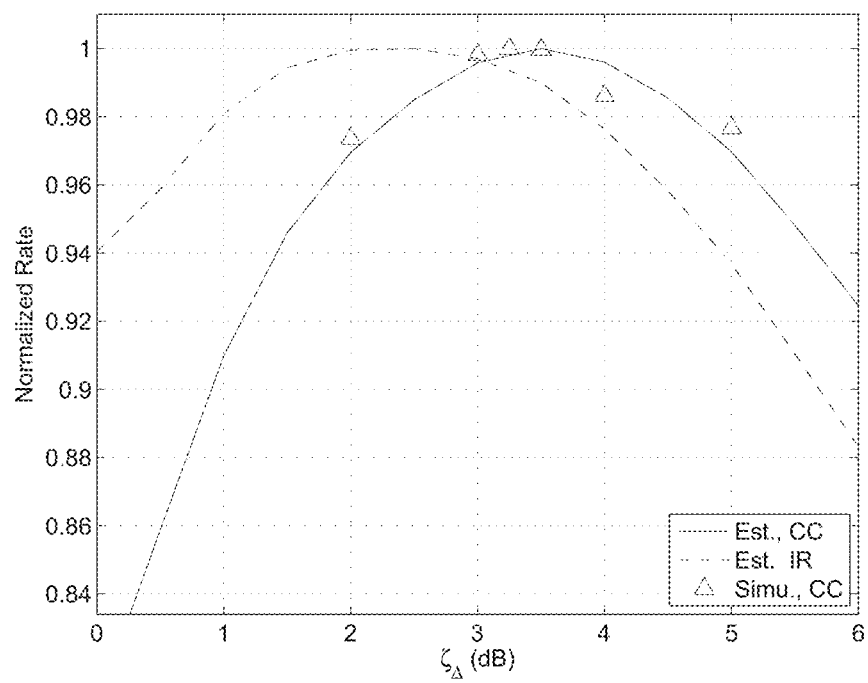
FIG. 8 depicts the normalized rate or spectral efficiency as a function of SINR offset $\zeta_A$ (dB).

We now evaluate the performance spectral efficiency as a function of the SINR offset $\zeta_A$. We consider the case of user pooling with long-term average SNR and rank-1 restriction. The normalized rate or spectral efficiency over the maximum value is shown in FIG. 8. The estimate average rates with Chase combining and IR based hybrid ARQ are obtained using (42) and (43), respectively, from the simulations for the SINR mismatch evaluation. The system level simulation results with Chase combining are also plotted. We can see that the normalized spectral efficiency matches quite well with the estimated rate. The optimal operation point is at about $\zeta_A$=3.25 dB with the corresponding spectral efficiency being 2.4227. Similarly, we can also find the better threshold for user pooling. However, we do not have a simple scheme except completely relying on simulations. We consider the same case as above, i.e., SU report employing user pooling based on long-term average SNR and rank-1 precoding restriction. We find that we can further improve the performance of MU-MIMO with average cell spectral efficiency being 2.4488 by using 12 dB as the pooling threshold.

Performance Improvement with MRC SINR Approximation

Figure 9:
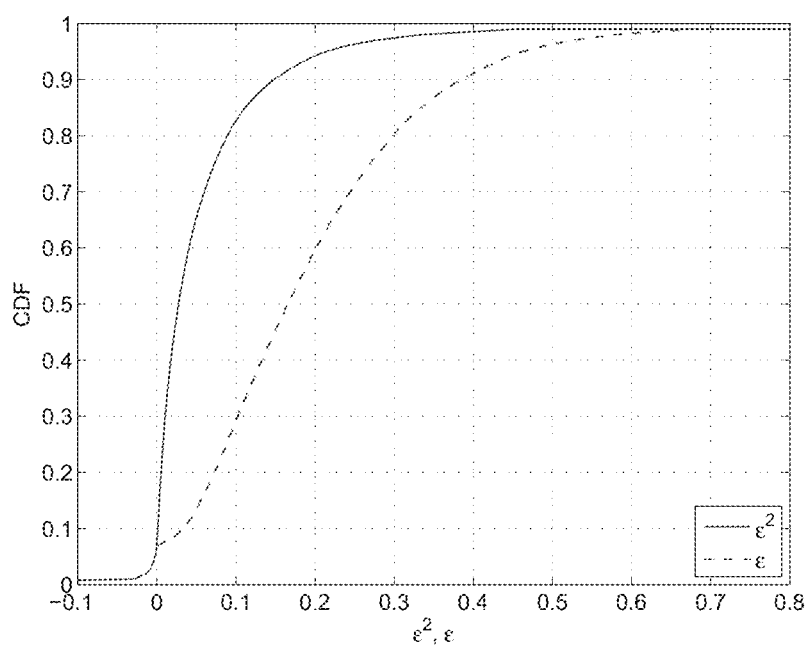
FIG. 9 depicts the CDF curves of $\epsilon$, $\epsilon^2$ for matching MRC SINR predication and actual SINR from simulations with $r_{max}=1$.
Figure 10:
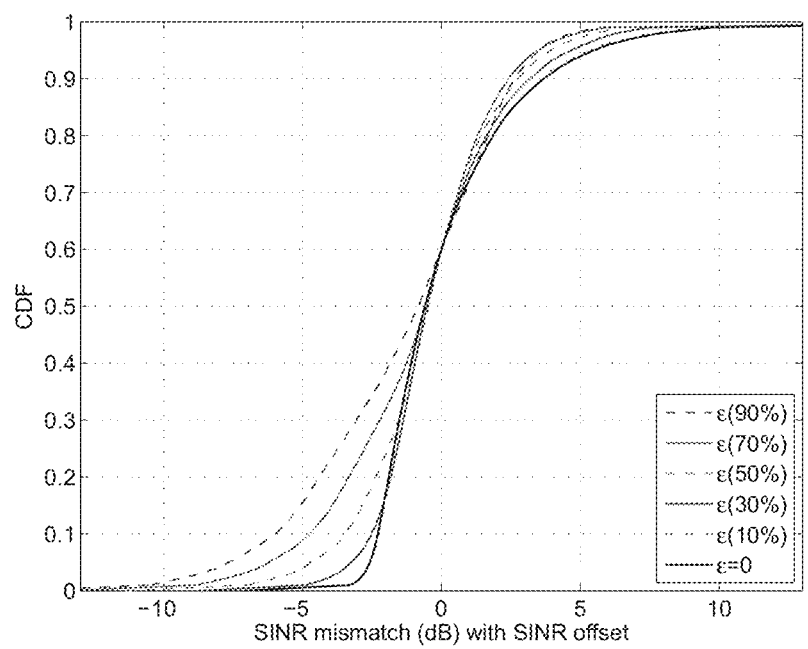
FIG. 10 depicts the CDF curves of SINR mismatch with various $\epsilon$ values.
Figure 11:
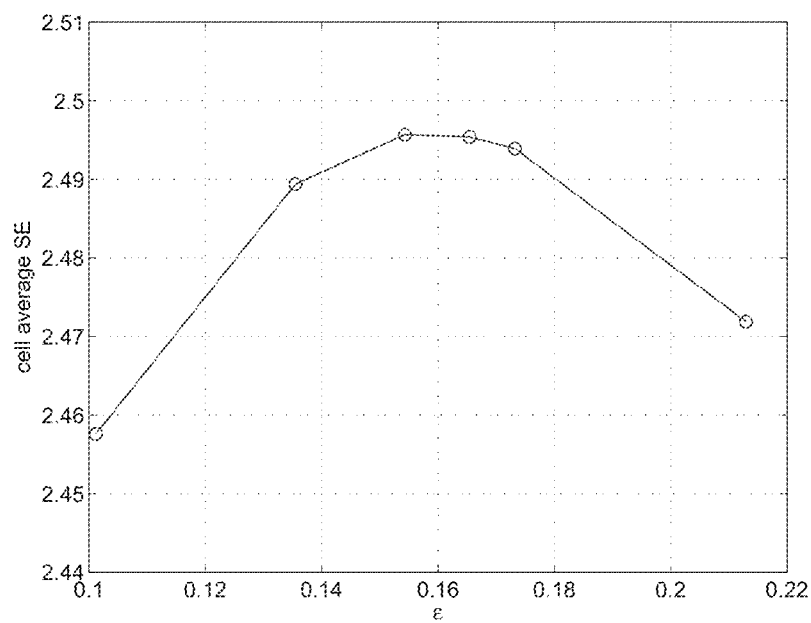
FIG. 11 depicts the cell average spectral efficiency as a function of $\epsilon$, $r_{max}=1$.

We now present the performance of SINR approximation using channel model given in (23). Due to high complexity of SDP optimization, we consider the signal model in (29) and SINR approximation for MRC receiver given in (33). The key issue of MRC SINR approximation for better rate matching is to find a good setting on $\epsilon$. To achieve this, we obtain sample values of $\epsilon^2$ from the simulator by matching the approximate MRC SINR with the actual SINR from the MMSE receiver. The CDF curve of $\epsilon^2$ is illustrated in FIG. 9. with $r_{max}$=1. Due to the channel uncertainty and outdate, it is possible that we obtain some negative values for $\epsilon^2$. With this CDF curve, we can set the $\epsilon^2$ or $\epsilon$ value corresponding to different CDF percentages. In FIG. 10 we illustrate the SINR mismatch CDF curves for MRC SINR approximations with different $\epsilon$ settings. For each CDF curve, a unique SINR offset is applied so that the 60% CDF point is moved to the zero point of the SINR mismatch. The case of $\epsilon$=0 is also included in the figure, which corresponds to previous case of the simple SINR scaling and the MMSE receiver. We can see that $\epsilon$ corresponding to the 70% CDF value provides the best performance in the positive region of SINR mismatch (SINR overestimate) which is closer to the step function than other settings. However, the simple SINR scaling, i.e., $\epsilon$=0, shows better performance in the negative region of SINR mismatch (SINR underestimate). Therefore, a tradeoff is necessary in both regions to have better performance. From FIG. 10 we can see that $\epsilon$ corresponding to the 50% CDF value could be a better choice. The results of cell average spectral efficiency for different $\epsilon$ values are shown in FIG. 11 without user pooling. The value of $\epsilon$=0.1654 corresponds to the 50% CDF value of $\epsilon$. The spectral efficiency for MRC SINR approximation with $\epsilon$=0.1654 is 2.4954, which is close to the optimum. We include this result in Table 2, FIG. 15. Also seen from Table 2 instant SINR feedback based user pooling, we can further improve the performance of MRC SINR approximation. The resulting spectral efficiency is 2.5141, a 17% gain over SU-MIMO.

Figure 12:
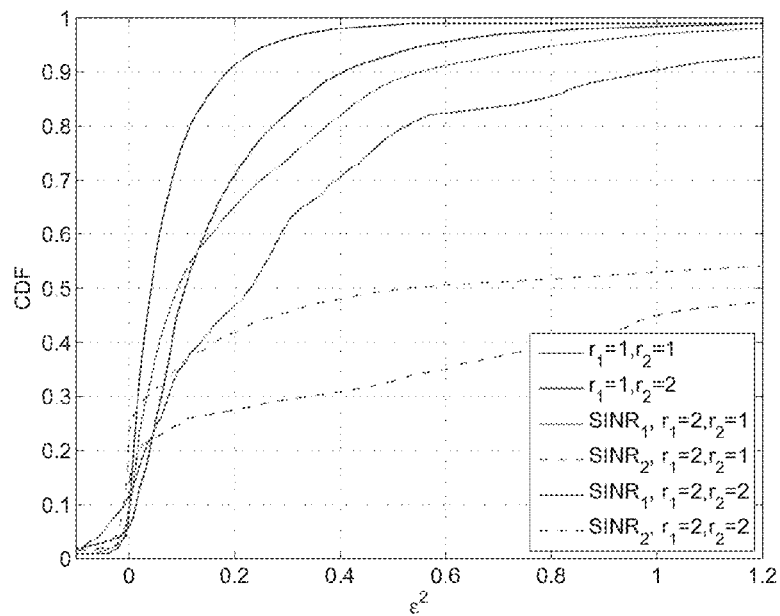
FIG. 12 depicts the CDF curves of $\epsilon$, $\epsilon^2$ for matching MRC SINR predication and actual SINR from simulations with $r_{max}=2$.

We now evaluate the statistics of $\epsilon^2$ for $r_{max}$=2. The resulting CDF curves are shown in FIG. 12. Since we consider up-to two-user pairing, we have total four scenarios, i.e., $(r_1, r_2)$=(1, 1), (1, 2), (2, 1), and (2, 2). We present the CDF curves for each scenario separately. Moreover, for the scheduled users with two layers, we illustrate the CDF curves separately for $\epsilon^2$ obtained from SINR matching for two layers. From FIG. 12. a diverse $\epsilon^2$ is observed for the second layers for both $(r_1$=2, $r_2$=1) and $(r_1$=2, $r_2$=2) cases, indicating a huge SINR mismatch for the data stream transmitted in the second layer. This is due to the co-polarized antenna setting with small antenna spacing, which is usually rank deficient. The receive SINR of the second stream is much smaller and suffering more by the interfering streams from co-scheduled users. Therefore, for the co-polarized antennas, it is better to pair the user with rank-1 transmissions.

6.2 Performance of MU-MIMO with MU Report

Figure 13:
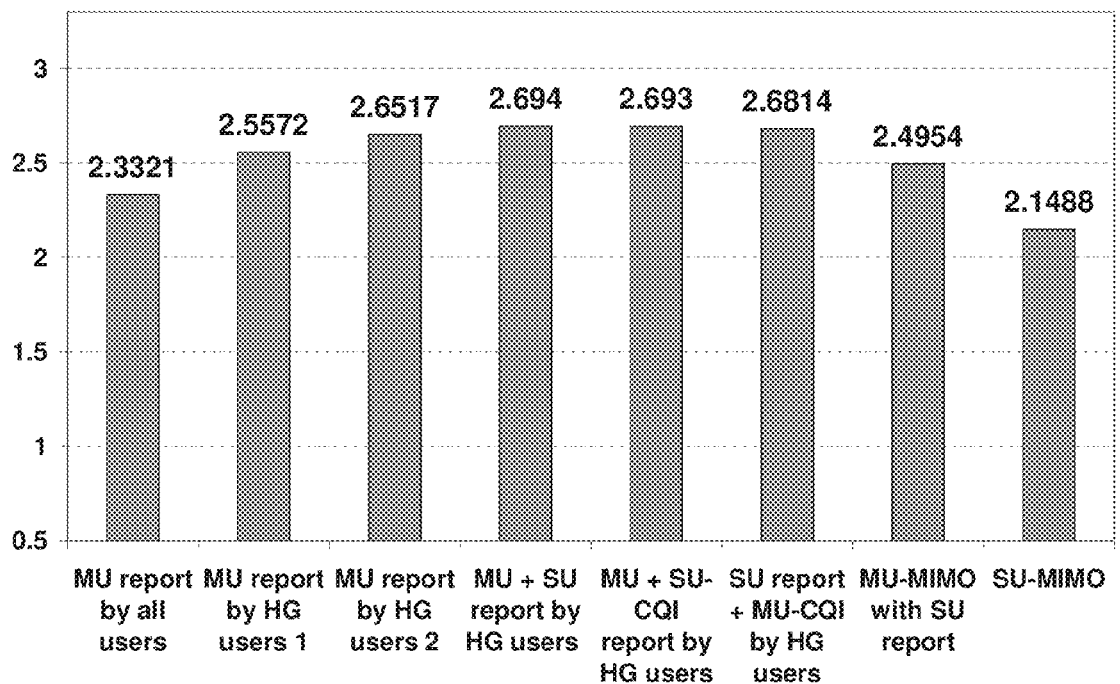
FIG. 13 depicts average cell spectral efficiency of MU-MIMO with MU feedback.

We now consider MU CSI report with the assumption of uniform power allocation. With both types of CSI reports can be obtained at user terminals, we can apply user pooling technique to configure the report mode of user terminal. We can let high geometry (HG) user terminals, i.e., the users with larger long-term average SNR, send back either MU CSI report only (without additional feedback channel resource) or both SU and MU CSI reports (with additional feedback channel resources) to the base station. Then at base station, we can also employ user pooling technique to schedule either SU or MU-MIMO transmissions based on the instantaneous channel feedback. FIG. 13 illustrates the performance of the average cell spectral efficiency for MU-MIMO with various report configurations, namely, MU report by all users, MU report by HG users without user pooling in the scheduler (denoted as case 1), MU report by HG users with user pooling and SINR offset for SU transmissions (denoted as case 2), both MU and SU report by HG users, the MU report and SU CQI report by HG users, and finally the SU report plus MU CQI report by HG users. We impose rank-1 restrictions on the CSI feedback. We can see from FIG. 13 that with MU CSI reports from all active users and without any additional processing, the average cell spectral efficiency is 2.3321 which is about 8.5% gain over the SU-MIMO. If high geometry users send back MU CSI reports and others send SU reports, the performance is improved with the average cell spectral efficiency being 2.5572 now, about 19% higher than that of SU-MIMO, and also about 2.5% higher than the MU-MIMO performance (without pooling) with only the SU reports from all users. If we apply the user pooling when performing user pairing for MU-MIMO based on the instantaneous feedback and also employ the SINR offset of $\zeta_A$=+1.5 dB on the MU SINR report when SU-MIMO is scheduled, the average cell spectral efficiency is then 2.6517, a 23.4% gain over the SU-MIMO and a 6.3% gain over the MU-MIMO with SU CSI reports. When both MU and SU complete CSI reports from HG users are available at the base station, the spectral efficiency becomes 2.694 with the cost of additional feedback channel resources. However, if we request only the CQI feedback for one type of report instead of full CSI reports to reduce the feedback overhead, the performance degradation is negligible. For example, with MU CSI and SU CQI reports from HG users, the spectral efficiency is 2.693, or with the SU CSI and MU CQI from HG users, the spectral efficiency is 2.6814. For both cases, the performance degradation is less than 0.5%. The detailed values including 5% cell edge spectral efficiency are provided in Table 3, FIG. 16. We can see that the cell edge performance is also improved with user pooling, SINR offset, and additional channel report.

6.3 Performance of MU Report Based on Nonuniform Power Allocation

Now we consider the MU report based on nonuniform power allocation. Here, the 4-bit CQI feedback is applied. The performance of MU-MIMO for both uniform and nonuniform power allocations with various settings on the channel feedback is listed in Table 4, FIG. 17. The percentage in the parentheses is the gain over the MU-MIMO with the SU report given in the second row. For the nonuniform power allocation, we set the power allocation factor $\alpha=0.5$. Again we impose rank-1 restrictions on all channel feedbacks. It is observed from Table 4 that for all settings, the channel feedback based on the nonuniform power allocation provides better spectral efficiency performance than the corresponding uniform power allocation with about 1-3% improvement. Compared with the performance of SU report, the performance gains are about 5-6.5%, which is impressive from the system level point of view.

7 CONCLUSIONS

In this paper, we have considered the performance improvement for practical DL MU-MIMO transmission with linear procoding and quantized channel feedback. Two types of channel reports from user terminals are treated, namely, the SU report assuming SU-MIMO transmissions and the MU reports assuming MU-MIMO transmissions. We have introduced several techniques to improve the MU-MIMO performance including SINR approximation, SINR offset, user pooling, and non-uniform power allocations in conjunction with various settings of CSI reports. The performance of proposed techniques has been evaluated by the system level simulations and the numerical results have demonstrated the efficiency of the proposed techniques for the performance enhancement on MU-MIMO.

APPENDIX A STATISTICS OF $\|R\|^2$

For a channel matrix H we obtain its SVD decomposition as $H=U\Lambda V^\dagger$. If the user preferred precoder has a rank $r\leq\min\{N, M\}$, we then assume that the user chooses to receive only along the span of its first r (r dominant) receive (left) singular vectors so that the model post-projection at the user is given by $$y=\tilde{H}x+\tilde{n}. \tag{A.1}$$

where $\tilde{H}$ is an r×M complex-valued matrix with SVD $\tilde{H}=\tilde{U}\tilde{\Lambda}\tilde{V}^\dagger$, where $\tilde{V}$ is an M×r matrix containing the r dominant right singular vectors of H. The precoder selection based on the Chordal distance is then given by $$\hat{G} = \arg\min_{G\in g_r}d^2(\tilde{V}, G) = \arg\min_{G\in g_r} r - tr[(\tilde{V}^\dagger G)(G^\dagger \tilde{V})], \tag{A.2}$$

where tr denotes the trace of a matrix. We then decompose $\tilde{V}$ as the summation of its components in the subspace of the reported semi-unitary precoder $\hat{G}$ and in the orthogonal subspace $\hat{G}^\perp$, given by $$\tilde{V}=\hat{G}XA+QB, \tag{A.3}$$

where X is a unitary matrix with $X^\dagger X=I_r$ and $QQ^\dagger=I-\hat{G}\hat{G}^\dagger$. So $\tilde{V}^\dagger=A^\dagger X^\dagger \hat{G}^\dagger+B^\dagger Q^\dagger$. Since $tr(\tilde{V}\tilde{V}^\dagger)=tr(\tilde{V}^\dagger\tilde{V})=r$, we then have $$tr(A^\dagger A)+tr(B^\dagger B)=r. \tag{A.4}$$

Thus, we have $$d^2(\tilde{V},G)=r-tr[(\tilde{V}^\dagger\hat{G})(\hat{G}^\dagger\tilde{V})]=r-tr(A^\dagger A)=tr(B^\dagger B). \tag{A.5}$$

To normalize the projection to the subspace of $\hat{G}$, we then have $$\hat{\tilde{V}}^\dagger = \sqrt{\frac{tr(AA^\dagger)}{r}}\left(\frac{A^\dagger X^\dagger}{\sqrt{tr(AA^\dagger)/r}}\hat{G}^\dagger + \frac{B^\dagger Q^\dagger}{\sqrt{tr(AA^\dagger)/r}}\right) \tag{A.6}$$

Therefore, from the channel approximation in (23), we have $$R^\dagger = \frac{B^\dagger}{\sqrt{tr(AA^\dagger)/r}}. \tag{A.7}$$

We then obtain $$\|R\|_F^2 = tr(RR^\dagger) = \frac{1}{tr(AA^\dagger)/r}tr(BB^\dagger) = \frac{r}{tr(AA^\dagger)}(r-tr(AA^\dagger)) \tag{A.8}$$

$$= \frac{r^2}{tr[(\tilde{V}^\dagger\hat{G})(\hat{G}^\dagger\tilde{V})]} - r.$$

Hence, given a channel matrix H, we first find $\tilde{V}$ and the preferred precoder $\hat{G}$, then obtain $\|R\|_F^2$ by (A.8). By generating the channel based on a certain channel statistics, we can obtain the statistics of $\|R\|_F^2$ and set a reasonable upper bound $\epsilon$ for the SINR approximation described in Section 4.2.

Since $I-\hat{G}\hat{G}^\dagger=QQ^\dagger$, we can obtain Q by QR decomposition of $I-\hat{G}\hat{G}^\dagger$.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for improving multiple-input multiple-output (MIMO) downlink transmissions, the method comprising:
    obtaining a channel state information (CSI) report including preferred matrix index (PMI) for precoding, channel quality index (CQI) and rank index (RI) at a base station from user terminals through a channel feedback;
    applying selectively a signal-to-interference-plus-noise-ratio (SINR) offset to an SINR of said CSI report;
    applying selectively a rate matching responsive to said SINR offset or said CSI report;
    controlling or adjusting said SINR offset; and
    applying an SINR scaling approximation for computing an SINR when exact precoders for co-scheduled streams are decided or evaluated during a scheduling including multiuser (MU) MIMO pairing and resource allocation, responsive selectively to said CSI report or a second said SINR offset.

2. The method of claim 1, wherein said rate matching is based on a multi-user (MU) CSI report directly if a multiuser (MU) MIMO is scheduled in said downlink transmission.

3. The method of claim 1, wherein said SINR offset is applied to the SINR contained in the single-user (SU) CSI report or the SINR approximation based on the single-user (SU) CSI report before said rate matching if a multiuser (MU) MIMO is scheduled in said downlink transmission.

4. The method of claim 1, wherein said SINR offset is applied to the SINR contained in the multi-user (MU) CSI report or the SINR approximation based on the multi-user (MU) CSI report before said rate matching if a single-user (SU) MIMO is scheduled in said downlink transmission.

5. The method of claim 1, wherein said controlling comprises a controller that is one of a unit of a scheduler or combined with a second controller.

6. The method of claim 1, further comprising applying a zero-forcing beamforming to said SINR scaling approximation if columns of an overall precoding matrix are not mutually orthogonal.

7. The method of claim 1, wherein said SINR scaling approximation comprises a channel approximation, a signal model with approximated channel, an SINR computation and an SINR approximation.

8. The method of claim 7, wherein said channel approximation comprises an approximation responsive to a semi-unitary matrix whose columns are a basis for the orthogonal complement to a range of a reported precoder from a user, a matrix which satisfies a Frobenius-norm constraint influenced by a size of a quantization codebook and channel statistics based in part on an SINR feedback for a particular stream of respective user based on single user (SU) said CSI reports or multiuser (MU) said CSI reports, respectively.

9. The method of claim 7, wherein said signal model with approximated channel comprises a same signal model expression as an original MU MIMO with channel matrix replaced by an approximation channel or a simplified model in which an introduced channel uncertainty affects only interfering streams.

10. The method of claim 7, wherein said SINR computation comprises computing an SINR for a respective receiver based on said signal model.

11. The method of claim 7, wherein said SINR approximation comprises, given a constraint on an uncertainty in a channel model, finding a conservative SINR as said SINR approximation for said rate matching and modulation and coding scheme (MCS) assignment.

12. The method of claim 1, wherein said channel feedback comprises, responsive to some feedback channel knowledge, pooling of users by said base station into two or more groups with one group of users sending back quantized instant channel information assuming a single user (SU) MIMO is scheduled and another group of users sending back quantized instant channel information for assuming a multiuser (MU) MIMO is scheduled.

13. The method of claim 1, further comprising, responsive to various channel feedbacks and a pooling metric, pooling of users is performed for selecting a user for multiuser (MU) MIMO pairing from which some users are considered for user pairing for MU MIMO transmission and other users are only considered for single user (SU) MIMO transmission.

* * * * *